(12) United States Patent
Cunningham et al.

(10) Patent No.: US 11,668,597 B2
(45) Date of Patent: Jun. 6, 2023

(54) DETECTING AND IDENTIFYING A CHANGE IN A VIBRATORY METER CONDITION BASED ON STIFFNESS CHANGE DETERMINATION AT TWO LOCATIONS ON THE CONDUIT

(71) Applicant: Micro Motion, Inc., Boulder, CO (US)

(72) Inventors: Timothy J. Cunningham, Boulder, CO (US); Andrew Timothy Patten, Boulder, CO (US); Mark James Bell, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 468 days.

(21) Appl. No.: 16/640,423

(22) PCT Filed: Aug. 30, 2017

(86) PCT No.: PCT/US2017/049344
§ 371 (c)(1),
(2) Date: Feb. 20, 2020

(87) PCT Pub. No.: WO2019/045703
PCT Pub. Date: Mar. 7, 2019

(65) Prior Publication Data
US 2020/0355542 A1 Nov. 12, 2020

(51) Int. Cl.
G01F 1/84 (2006.01)
G01F 25/10 (2022.01)
G01N 9/00 (2006.01)

(52) U.S. Cl.
CPC ............ G01F 25/10 (2022.01); G01F 1/8422 (2013.01); G01F 1/8427 (2013.01);
(Continued)

(58) Field of Classification Search
None
See application file for complete search history.

(56) References Cited

U.S. PATENT DOCUMENTS 5,734,112 A * 3/1998 Bose .................... G01F 1/8431
73/861.56
2004/0064212 A1 4/2004 Samata et al.
(Continued)

FOREIGN PATENT DOCUMENTS

JP 2004169989 A 6/2004

OTHER PUBLICATIONS

Timothy Cunningham: "Using Structural Integrity Meter Verification to Track Corrosion in Coriolis Flowmeters", Sep. 2, 2009 (Sep. 2, 2009), XP055486871, Retrieved from the Internet: URL:http://www.emerson.com/documents/automation/using-structural-integrity-meter-verificaiton-to-track-corrosion-in-coriolis-flowmeters-en-66236.pdf [retrieved on Jun. 21, 2018].
(Continued)

*Primary Examiner* — Harshad R Patel
(74) *Attorney, Agent, or Firm* — The Ollila Law Group LLC

(57) ABSTRACT

A meter electronics (20) and a method for detecting and identifying a change in a vibratory meter (5) is provided. The meter electronics (20) includes an interface (201) configured to receive sensor signals (100) from a meter assembly (10) and provide information based on the sensor signals (100) and a processing system (202) communicatively coupled to the interface (201). The processing system (202) is configured to use the information to determine a first stiffness change (244) associated with a first location of a conduit (130, 130') of the vibratory meter (5), determine a second stiffness change (254) associated with a second location of the conduit (130, 130') of the vibratory meter (5), and determine a condition of the conduit (130, 130') based on the first stiffness change and the second stiffness change.

15 Claims, 7 Drawing Sheets

(52) U.S. Cl.
CPC .......... *G01F 1/8436* (2013.01); *G01F 1/8477* (2013.01); *G01N 9/002* (2013.01); *G01N 2009/006* (2013.01)

(56) References Cited

U.S. PATENT DOCUMENTS

| | | | |
|---|---|---|---|
| 2008/0234949 A1* | 9/2008 | Stack | G01F 1/8436 702/48 |
| 2008/0281535 A1 | 11/2008 | Rensing et al. | |
| 2016/0320227 A1* | 11/2016 | Cunningham | G01F 1/8436 |

OTHER PUBLICATIONS

Nathan Hedrick: "How flowmeters perform self-verification", Jul. 11, 2017 (Jul. 11, 2017), XP055473728, Retrieved from the Internet: URL:https://www.us.endress.com/_storage/asset/4231524/storage/master/file/14364290/download/How%20flowmeters%20perform%20self-verification.pdf [retrieved on May 8, 2018].

* cited by examiner

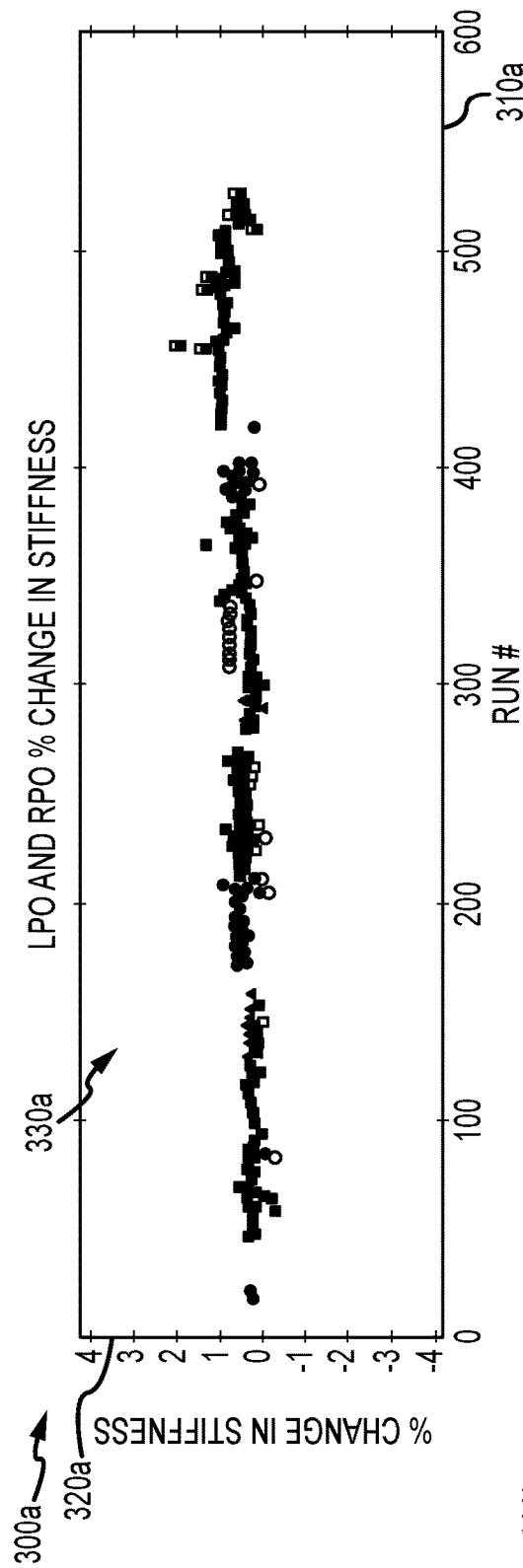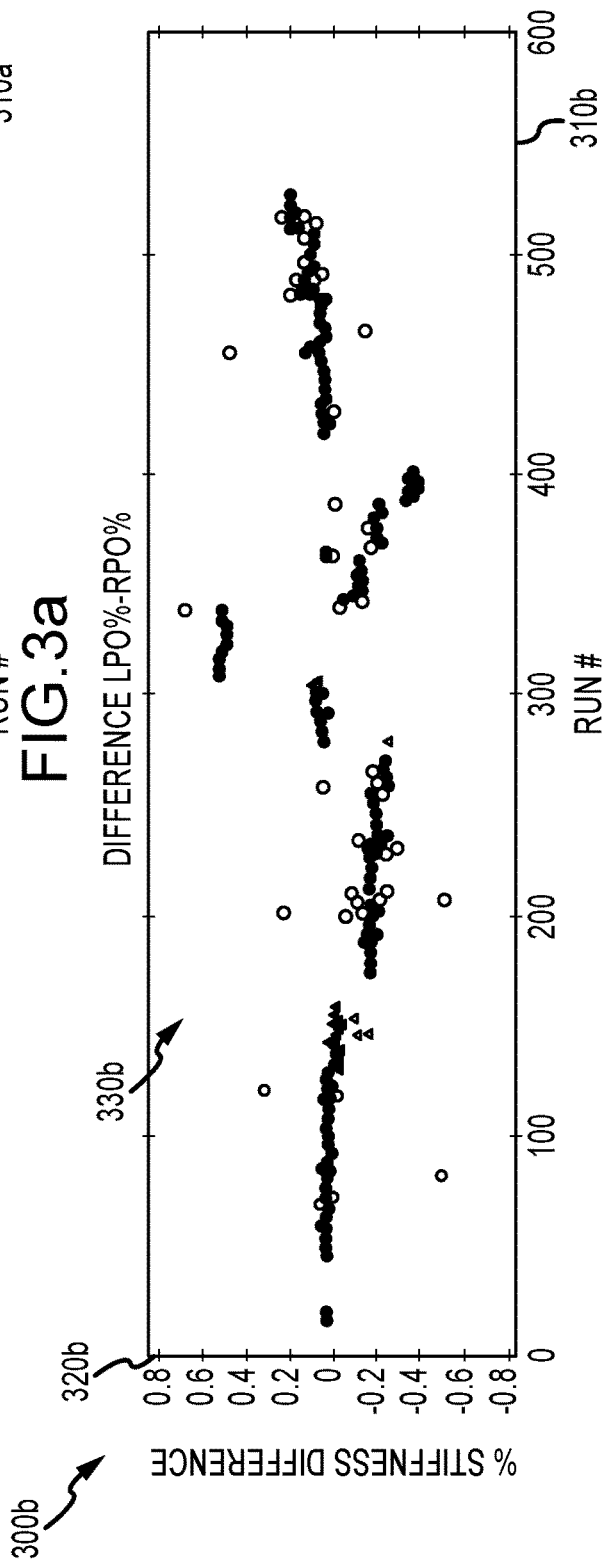

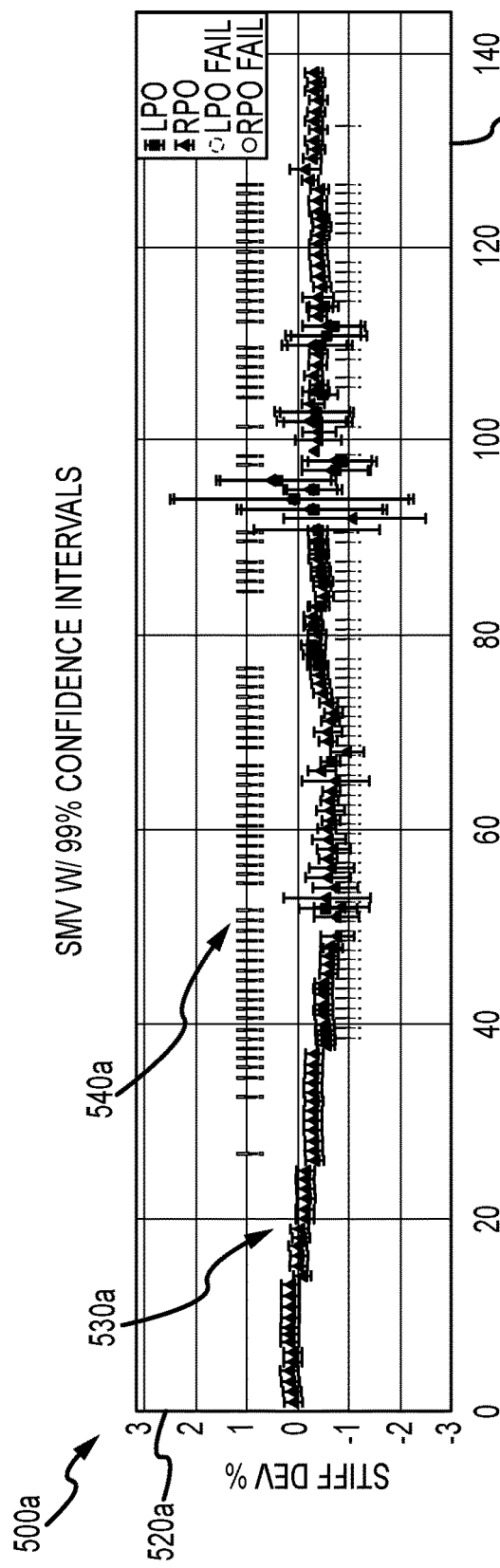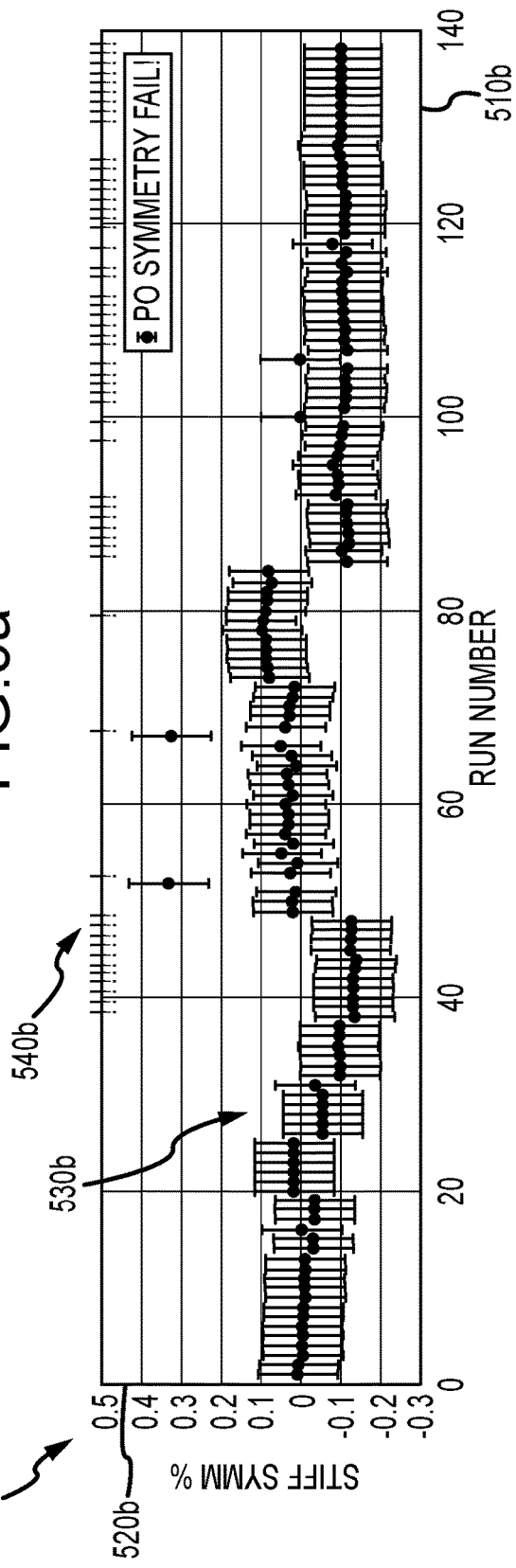
FIG.5a
FIG.5b

DETECTING AND IDENTIFYING A CHANGE IN A VIBRATORY METER CONDITION BASED ON STIFFNESS CHANGE DETERMINATION AT TWO LOCATIONS ON THE CONDUIT

TECHNICAL FIELD

The embodiments described below relate to changes in a vibratory meter and, more particularly, to detecting and identifying the change in the vibratory meter.

BACKGROUND

Vibratory meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring characteristics of fluids. Generally, vibratory meters comprise a meter assembly and an electronics portion. The material within the meter assembly may be flowing or stationary. Each type of sensor may have unique characteristics, which a meter must account for in order to achieve optimum performance. For example, some sensors may require a tube apparatus to vibrate at particular displacement levels. Other meter assembly types may require special compensation algorithms.

The meter electronics, among performing other functions, typically include stored sensor calibration values for the particular sensor being used. For example, the meter electronics may include a stiffness measurement. The reference sensor stiffness represents a fundamental measurement related to the sensor geometry for a specific meter assembly, for example, as measured in the factory under reference conditions or when it was last calibrated. A change between a stiffness measured after a vibratory meter is installed at a customer site and a reference sensor stiffness may represent physical change in the meter assembly due to coating, erosion, corrosion, or damage to conduits in the meter assembly, in addition to other causes. A meter verification or health check test can detect these changes.

The meter verification may determine if a difference between the measured stiffness and the reference stiffness is within a range. For example, the comparison may determine if the measured stiffness within a range of the reference stiffness. If the comparison indicates a change of greater than or outside the range, the vibratory meter can send an alarm to notify the user to investigate the fault. This simple comparison of a single stiffness value may not, however, be able to indicate the underlying cause of the fault. That is, the user will not know if the fault is due to erosion/corrosion, damage (e.g., freezing, over-pressurization, etc.), or a coating. This is due to the range being set to include all of the possible underlying causes or changes to the conduits and to prevent false alarms—causes that are not due to changes in the conduits. Examples of false alarms are increased variation in stiffness measurements caused by high velocity or high noise gas flows.

If the changes can be correctly detected, then the changes can be detected early in their formation. Additionally, correctly detecting the changes can minimize false alarms. If the changes to the conduits can be identified, the user can be notified with an indication of the nature of the change. This can prevent downtime of the vibratory meter due to false alarms and ensure that the post-alarm procedures are more suited to the condition in the vibratory meter. Accordingly, there is a need for detecting and identifying a change in a vibratory meter.

SUMMARY

A meter electronics for detecting and identifying a change in a vibratory meter is provided. According to an embodiment, the meter electronics comprises an interface configured to receive sensor signals from a meter assembly and provide information based on the sensor signals and a processing system communicatively coupled to the interface. The processing system is configured to use the information to determine a first stiffness change associated with a first location of a conduit of the vibratory meter, determine a second stiffness change associated with a second location of the conduit of the vibratory meter, and determine a condition of the conduit based on the first stiffness change and the second stiffness change.

A meter electronics for detecting and identifying a change in a vibratory meter is provided. According to an embodiment, the meter electronics comprises a processing system including a storage system configured to store a central tendency value of a meter verification parameter and dispersion value of the meter verification parameter. The processing system is configured to obtain the central tendency value and the dispersion value from the storage system and determine a probability based on the central tendency value and the dispersion value to detect if the central tendency value is different than a baseline value.

A method for detecting and identifying a change in a vibratory meter is provided. The method comprises determining a first stiffness change associated with a first location of a conduit of the vibratory meter, determining a second stiffness change associated with a second location of the conduit of the vibratory meter, and determining a condition of the conduit based on the first stiffness change and the second stiffness change.

A method for detecting and identifying a change in a conduit of the vibratory meter is provided. According to an embodiment, the method comprises obtaining a central tendency value of a meter verification parameter and a dispersion value of the meter verification parameter from a storage in a meter electronics of the vibratory meter and determining the probability based on the central tendency value and the dispersion value to determine if the central tendency value is different than a baseline value.

Aspects

According to an aspect, a meter electronics (20) for detecting and identifying a change in a vibratory meter (5) comprises an interface (201) configured to receive sensor signals (100) from a meter assembly (10) and provide information based on the sensor signals (100) and a processing system (202) communicatively coupled to the interface (201). The processing system (202) is configured to use the information to determine a first stiffness change associated with a first location of a conduit (130, 130') of the vibratory meter (5), determine a second stiffness change associated with a second location of the conduit (130, 130') of the vibratory meter (5), and determine a condition of the conduit (130, 130') based on the first stiffness change and the second stiffness change.

Preferably, the first location is a location of a left pick-off sensor (170l) on the conduit (130, 130') of the vibratory meter (5) and the second location is a location of a right pick-off sensor (170r) on the conduit (130, 130') of the vibratory meter (5). Preferably, the first stiffness change represents a physical stiffness change of the conduit (130, 130') between a driver (180) and the first location of the conduit (130, 130') and the second stiffness change represents a physical stiffness change of the conduit (130, 130') between the driver (180) and the second location of the conduit (130, 130').

Preferably, the meter electronics (20) is further configured to determine a stiffness symmetry of the conduit (130, 130').

Preferably, the stiffness symmetry of the conduit (130, 130') is determined based on the first stiffness change and the second stiffness change.

Preferably, the processing system (202) is further configured to provide an alarm based on the determination of the condition of the conduit.

Preferably, the condition of the conduit (130, 130') comprises at least one of an erosion, a corrosion, a damage, and a coating of the conduit (130, 130') of the vibratory meter (5).

Preferably, the processing system (202) is further configured to determine the condition of the conduit (130, 130') based on at least one of a residual flexibility, a damping, and a mass of the conduit (130, 130').

A meter electronics (20) for detecting and identifying a change in a vibratory meter (5) comprises a processing system (202) including a storage system (204) configured to store a central tendency value of a meter verification parameter and dispersion value of the meter verification parameter. The processing system (202) is configured to obtain the central tendency value and the dispersion value from the storage system (204) and determine a probability based on the central tendency value and the dispersion value to detect if the central tendency value is different than a baseline value.

Preferably, the processing system (202) being configured to determine a probability based on the central tendency value and the dispersion value comprises the processing system (202) being configured to calculate a t-value and calculate the probability using the t-value.

Preferably, the processing system (202) being configured to determine the probability based on the central tendency value and the dispersion value comprises the processing system (202) being configured to calculate a degree-of-freedom based on the number of meter stiffness measurements comprising a meter stiffness.

Preferably, the processing system (202) being configured to determine the probability based on the central tendency value and the dispersion value comprises the processing system (202) being configured to calculate a standard error based on a standard deviation and the degree-of-freedom.

Preferably, the standard error is calculated using the following equation:

$$stderror_{pooled} = \sqrt{\frac{(2 \cdot (stddev_{pooled})^2)}{n_{DOF}}};$$

where:
stddev$_{pooled}$ is the meter stiffness standard deviation; and
n$_{DOF}$ is the degrees-of-freedom.

Preferably, the dispersion value is a pooled standard deviation comprising a standard deviation of meter stiffness measurements and baseline meter stiffness measurements.

Preferably, the probability comprises a confidence interval of the central tendency value.

Preferably, the confidence interval is compared to zero, wherein: if the confidence interval does not include zero, then detect that the central tendency value does not equal the baseline value and if the confidence interval includes zero, then detect that the central tendency value equals the baseline value.

Preferably, the central tendency value is a meter stiffness and the confidence interval of the meter stiffness is calculated using the following equation:

$$CI = Stiffness_{mean} \pm CI_{range};$$

where:
CI is the confidence interval of the meter stiffness;
Stiffness$_{mean}$ is the meter stiffness obtained from the storage system (204); and
CI$_{range}$ is a confidence interval range calculated based on the meter stiffness standard deviation and a t-value.

Preferably, the confidence interval range is calculated using the following equation:

$$CI_{range} = stderror_{pooled} \cdot t_{student,99,8};$$

where:
stddev$_{pooled}$ is the meter stiffness standard deviation; and
t$_{student,99,8}$ is a t-value calculated based on a significance level and a degrees-of-freedom determined from a number of meter stiffness measurements comprising the meter stiffness.

Preferably, the processing system (202) is further configured to set a bias dead band, wherein if the central tendency value is less than the bias dead band, then the meter stiffness is not detected as being different than the central tendency value.

According to an aspect, a method for detecting and identifying a change in a vibratory meter comprises determining a first stiffness change associated with a first location of a conduit of the vibratory meter, determining a second stiffness change associated with a second location of the conduit of the vibratory meter, and determining a condition of the conduit based on the first stiffness change and the second stiffness change.

Preferably, the first location is a location of a left pick-off sensor on the conduit of the vibratory meter and the second location is a location of a right pick-off sensor on the conduit of the vibratory meter.

Preferably, the first stiffness change represents a physical stiffness change of the conduit between a driver and the first location of the conduit and the second stiffness change represents a physical stiffness change of the conduit between the driver and the second location of the conduit.

Preferably, the method further comprises determining a stiffness symmetry of the conduit.

Preferably, the stiffness symmetry of the conduit is determined based on the first stiffness change and the second stiffness change.

Preferably, the method further comprises providing an alarm based on the determination of the condition of the conduit.

Preferably, the condition of the conduit comprises at least one of an erosion, a corrosion, a damage, and a coating of the conduit of the vibratory meter.

According to an aspect, a method for detecting and identifying a change in a conduit of the vibratory meter comprises obtaining a central tendency value of a meter verification parameter and a dispersion value of the meter verification parameter from a storage in a meter electronics of the vibratory meter and determining the probability based on the central tendency value and the dispersion value to determine if the central tendency value is different than a baseline value.

Preferably, determining a probability based on the central tendency value and the dispersion value comprises calculating a t-value and calculating the probability using the t-value.

Preferably, determining the probability based on the central tendency value and the dispersion value comprises calculating a degree-of-freedom based on a number of meter stiffness measurements comprising a meter stiffness.

Preferably, determining the probability based on the meter stiffness comprises calculating a standard error based on a standard deviation and the degrees-of-freedom.

Preferably, the standard error is calculated using the following equation:

$$stderror_{pooled} = \sqrt{\frac{(2 \cdot (stddev_{pooled})^2)}{n_{DOF}}};$$

where:
$stddev_{pooled}$ is the meter stiffness standard deviation; and
$n_{DOF}$ is the degrees-of-freedom.

Preferably, the dispersion value is a pooled standard deviation comprising a standard deviation of meter stiffness measurements and baseline meter stiffness measurements.

Preferably, the probability comprises a confidence interval of the central tendency value.

Preferably, the confidence interval is compared to zero, wherein: if the confidence interval does not include zero, then detect that the central tendency value does not equal the baseline value and if the confidence interval includes zero, then detect that the central tendency value equals the baseline value.

Preferably, the central tendency value is a meter stiffness and the confidence interval of the meter stiffness is calculated using the following equation:

CI=Stiffness$_{mean}$±CI$_{range}$;

where:
CI is the confidence interval of the meter stiffness;
Stiffness$_{mean}$ is the meter stiffness obtained from the storage system (204); and
CI$_{range}$ is a confidence interval range calculated based on a meter stiffness standard deviation and a t-value.

Preferably, the confidence interval range is calculated using the following equation:

CI=stderror$_{pooled}$·t$_{student,99,8}$;

where:
stddev$_{pooled}$ is the meter stiffness standard deviation; and
t$_{student,99,8}$ is a t-value calculated based on a significance level and a degrees-of-freedom determined from a number of meter stiffness measurements comprising the meter stiffness.

Preferably, the method further comprises setting a bias dead band, wherein if the central tendency value is less than the bias dead band, then the central tendency value is not detected as being different than the baseline value.

According to an aspect, a method for detecting and identifying a change in a vibratory meter comprises determining a first stiffness change associated with a first location of a conduit of the vibratory meter, determining a second stiffness change associated with a second location of the conduit of the vibratory meter, and determining a condition of the conduit based on the first stiffness change and the second stiffness change.

Preferably, the first location is a location of a left pick-off sensor on the conduit of the vibratory meter and the second location is a location of a right pick-off sensor on the conduit of the vibratory meter.

Preferably, the first stiffness change represents a physical stiffness change of the conduit between a driver and the first location of the conduit and the second stiffness change represents a physical stiffness change of the conduit between the driver and the second location of the conduit.

Preferably, the method further comprises determining a stiffness symmetry of the conduit.

Preferably, the stiffness symmetry of the conduit is determined based on the first stiffness change and the second stiffness change.

Preferably, the method further comprises providing an alarm based on the determination of the condition of the conduit.

Preferably, the condition of the conduit comprises at least one of an erosion, a corrosion, a damage, and a coating of the conduit of the vibratory meter.

Preferably, the method further comprises determining the condition of the conduit based on at least one of a residual flexibility, a damping, and a mass of the conduit.

BRIEF DESCRIPTION OF THE DRAWINGS

The same reference number represents the same element on all drawings. It should be understood that the drawings are not necessarily to scale.

FIGS. 3a and 3b show graphs 300a, 300b that illustrate stiffness change and stiffness symmetry variations determined during multiple meter verification runs.

FIGS. 5a and 5b show graphs 500a, 500b that illustrate stiffness change and stiffness symmetry variation data points determined during multiple meter verification runs, where a probability is assigned to each data point.

DETAILED DESCRIPTION

FIGS. 1-7 and the following description depict specific examples to teach those skilled in the art how to make and use the best mode of embodiments of detecting and identifying a change in the vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of detecting and identifying the change in the vibratory meter. As a result, the embodiments described below are not limited to the specific examples described below, but only by the claims and their equivalents.

The change in the vibratory meter can be accurately detected by using statistics. Statistics previously was not used in a meter electronics due to the meter electronics having limited computing abilities compared to, for example, a computer workstation running statistical software. The statistical methods employed herein exploits data available in registers of a processing system in the meter electronics to enable embedded code to calculate a probability that a change is not present in the vibratory meter. By calculating this probability, a null hypothesis that changes have not occurred can be disproven, thereby indicating that a change has occurred in the vibratory meter. Because the probability is calculated by the meter electronics, even with limited computing resources, this probability may be updated as the meter verifications are performed. Accordingly, changes that would not be detected by comparing a stiffness change to, for example, a predetermined limit, can be detected. In addition, the accurate detection of the change can prevent false alarms.

The change in the vibratory meter can be identified by determining a condition, such as erosion, corrosion, damage, or the like, of a conduit of the vibratory meter based on a first stiffness change associated with a first location of the conduit and a second stiffness change associated with a second location of the conduit. For example, the condition may be determined based on whether the first and second stiffness changes indicate an increase or decrease in stiffness. Additionally, the symmetry of the first and second stiffness changes may be used to determine the condition. In one example, if the first stiffness change indicates a decrease, the second stiffness change indicates an increase, and the stiffness symmetry is considered "right low", then the determined condition may be erosion or corrosion of the conduits in the vibratory meter.

Figure 1:
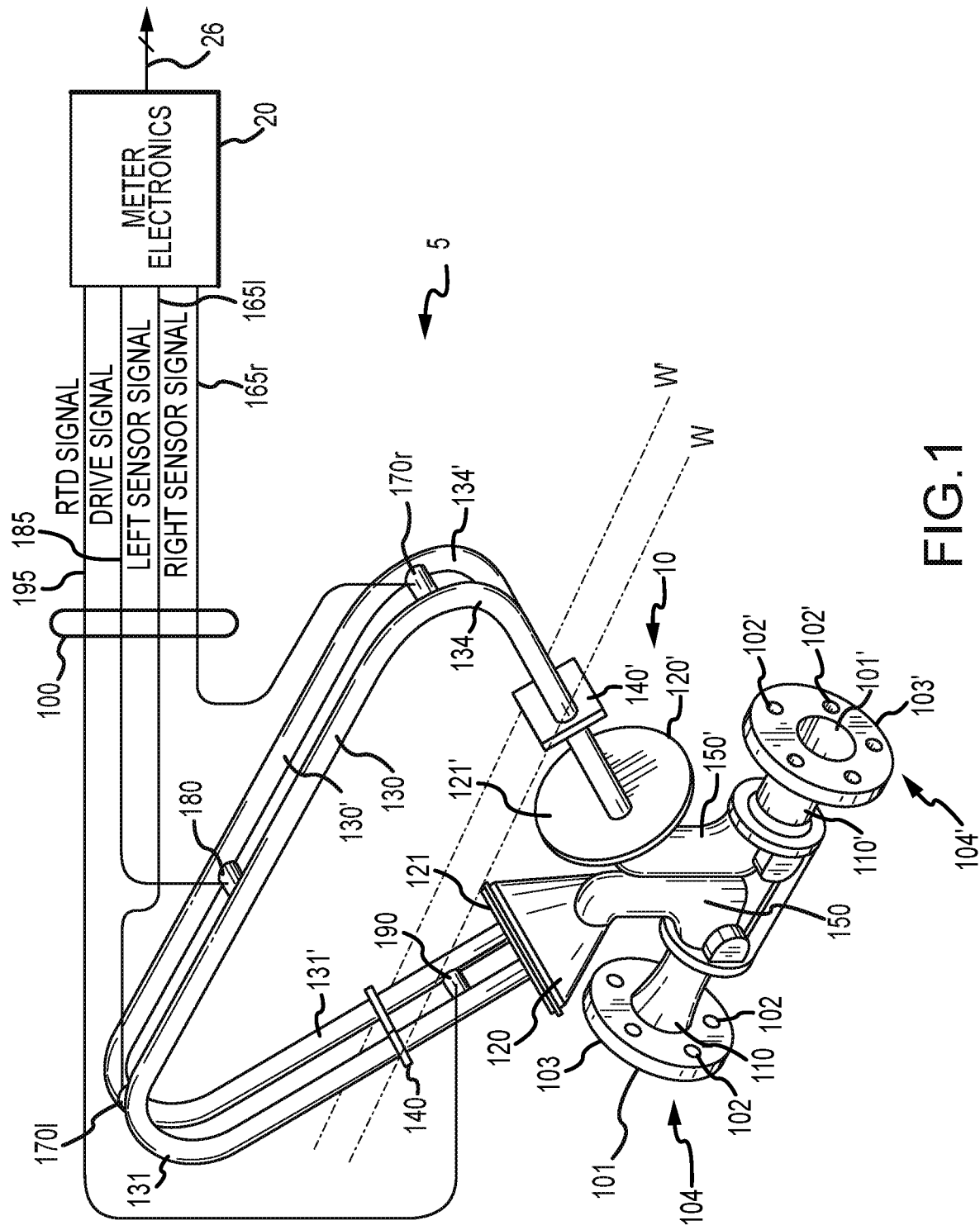
FIG. 1 shows a vibratory meter 5.

FIG. 1 shows a vibratory meter 5. As shown in FIG. 1, the vibratory meter 5 comprises a meter assembly 10 and meter electronics 20. The meter assembly 10 responds to mass flow rate and density of a process material. The meter electronics 20 is connected to the meter assembly 10 via sensor signals 100 to provide density, mass flow rate, and temperature information over path 26, as well as other information.

The meter assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal is applied by the meter electronics 20, via lead 185, to the driver 180.

The meter electronics 20 receives the RTD temperature signal on lead 195, and the left and right sensor signals appearing on sensor signals 100 carrying the left and right sensor signals 165l, 165r, respectively. The meter electronics 20 produces the drive signal appearing on lead 185 to driver 180 and vibrate conduits 130, 130'. The meter electronics 20 processes the left and right sensor signals and the RTD signal to compute the mass flow rate and the density of the material passing through meter assembly 10. This information, along with other information, is applied by meter electronics 20 over path 26 as a signal.

A mass flow rate measurement $\dot{m}$ can be generated according to the equation:

$$\dot{m} = FCF[\Delta t - \Delta t_0] \qquad [1]$$

The $\Delta t$ term comprises an operationally-derived (i.e., measured) time delay value comprising the time delay existing between the pick-off sensor signals, such as where the time delay is due to Coriolis effects related to mass flow rate through the vibratory meter 5. The measured $\Delta t$ term ultimately determines the mass flow rate of the flow material as it flows through the vibratory meter 5. The $\Delta t_0$ term comprises a time delay at zero flow calibration constant. The $\Delta t_0$ term is typically determined at the factory and programmed into the vibratory meter 5. The time delay at zero flow $\Delta t_0$ term will not change, even where flow conditions are changing. The flow calibration factor FCF is proportional to the stiffness of the flow meter.

It is a problem that the conduits may change with time, wherein an initial factory calibration may change over time as the conduits 130, 130' are corroded, eroded, or otherwise changed. As a consequence, the conduits' 130, 130' stiffness may change from an initial representative stiffness value (or original measured stiffness value) over the life of the vibratory meter 5. Meter verification can detect such changes in the conduits' 130, 130' stiffness, as is explained below.

Figure 2:
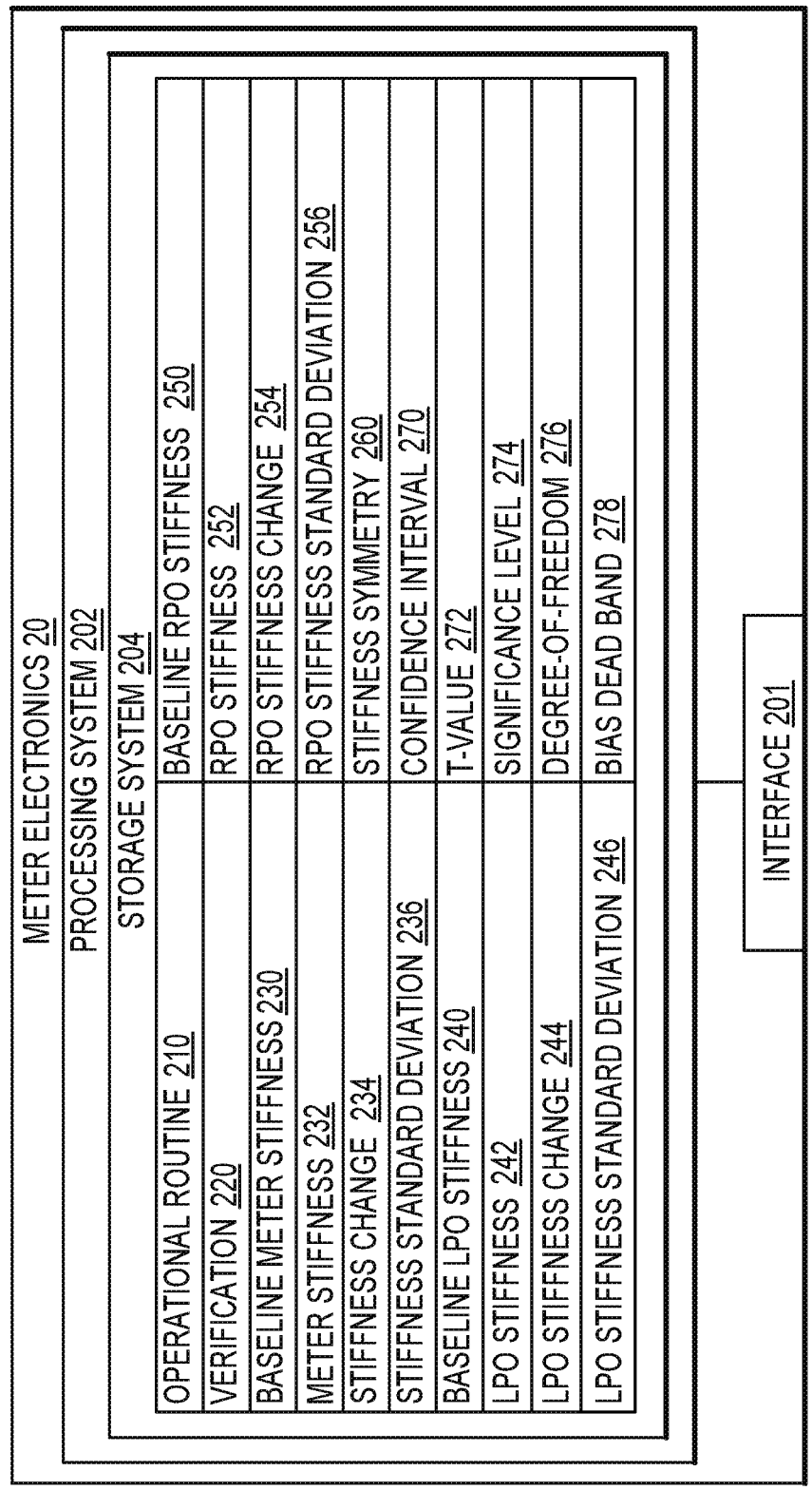
FIG. 2 shows the meter electronics 20 for detecting and identifying a change in a vibratory meter according to an embodiment.

FIG. 2 shows the meter electronics 20 for detecting and identifying a change in a vibratory meter according to an embodiment. The meter electronics 20 can include an interface 201 and a processing system 202. The meter electronics 20 receives a vibrational response, such as from the meter assembly 10, for example. The meter electronics 20 processes the vibrational response in order to obtain flow characteristics of the flow material flowing through the meter assembly 10.

As previously discussed, the flow calibration factor FCF reflects the material properties and cross-sectional properties of the flow tube. A mass flow rate of flow material flowing through the flow meter is determined by multiplying a measured time delay (or phase difference/frequency) by the flow calibration factor FCF. The flow calibration factor FCF can be related to a stiffness characteristic of the meter assembly. If the stiffness characteristic of the meter assembly changes, then the flow calibration factor FCF will also change. Changes in the stiffness of the flow meter therefore will affect the accuracy of the flow measurements generated by the flow meter.

The interface 201 receives the vibrational response from one of the pick-off sensors 170l, 170r via the sensor signals 100 of FIG. 1. The interface 201 can perform any necessary or desired signal conditioning, such as any manner of formatting, amplification, buffering, etc. Alternatively, some or all of the signal conditioning can be performed in the processing system 202. In addition, the interface 201 can enable communications between the meter electronics 20 and external devices. The interface 201 can be capable of any manner of electronic, optical, or wireless communication. The interface 201 can provide information based on the vibrational response.

The interface 201 in one embodiment is coupled with a digitizer (not shown), wherein the sensor signal comprises an analog sensor signal. The digitizer samples and digitizes an analog vibrational response and produces the digital vibrational response.

The processing system 202 conducts operations of the meter electronics 20 and processes flow measurements from the meter assembly 10. The processing system 202 executes one or more processing routines and thereby processes the flow measurements in order to produce one or more flow characteristics. The processing system 202 is communicatively coupled to and is configured to receive the information from the interface 201.

The processing system 202 can comprise a general purpose computer, a micro-processing system, a logic circuit, or some other general purpose or customized processing device. Additionally or alternatively, the processing system 202 can be distributed among multiple processing devices. The processing system 202 can also include any manner of integral or independent electronic storage medium, such as the storage system 204.

The storage system 204 can store flow meter parameters and data, software routines, constant values, and variable values. In one embodiment, the storage system 204 includes routines that are executed by the processing system 202, such as the operational routine 210 and verification 220 of the vibratory meter 5. The storage system can also store statistical values, such as, a standard deviation, confidence intervals or the like.

The storage system 204 can store a baseline meter stiffness 230. The baseline meter stiffness 230 may be determined during manufacturing or calibration of the vibratory meter 5, or during a prior recalibration. For example, the baseline meter stiffness 230 can be determined by the verification 220 before the vibratory meter 5 is installed in the field. The baseline meter stiffness 230 is representative of the stiffness of the conduits 130, 130' before any changes have occurred, such as erosion/corrosion, damage (e.g., freezing, over-pressurization, etc.), coatings, etc. The baseline meter stiffness 230 may be a mean of a plurality of baseline meter stiffness measurements. As such, the baseline meter stiffness 230 may have an associated dispersion characteristic, as will be discussed in more detail below, where the baseline meter stiffness measurements may vary. The more the baseline meter stiffness measurements vary, the greater the dispersion.

The storage system 204 can store a meter stiffness 232. The meter stiffness 232 comprises a stiffness value that is determined from vibrational responses generated during operation of the vibratory meter 5. The meter stiffness 232 may be generated in order to verify proper operation of the vibratory meter 5. The meter stiffness 232 may be generated for a verification process, wherein the meter stiffness 232 serves the purpose of verifying proper and accurate operation of the vibratory meter 5. Similar to the baseline meter stiffness 230, the meter stiffness 232 may be a mean of a plurality of meter stiffness measurements. As such, the meter stiffness 232 may have an associated dispersion characteristic, as will be discussed in more detail below, where the meter stiffness measurements may vary. The more the meter stiffness measurements vary, the greater the dispersion characteristic.

The storage system 204 can store a stiffness change 234. The stiffness change 234 can be a value that is determined by comparing the baseline meter stiffness 230 and the meter stiffness 232. For example, the stiffness change 234 can be a difference between the baseline meter stiffness 230 and the meter stiffness 232. In this example, a negative number may indicate that the stiffness of the conduits 130, 130' increased since being installed in the field. A positive number may indicate that the physical stiffness of the conduits 130, 130' decreased since the baseline meter stiffness 230 was determined.

As can be appreciated, the comparison may be performed in various ways. For example, the stiffness change 234 may be a difference between the meter stiffness 232 and the baseline meter stiffness 230. Accordingly, an increase in stiffness will result in a positive number and a decrease in stiffness will result in a negative number. Additionally or alternatively, values derived from or related to the baseline meter stiffness 230 and/or the meter stiffness 232 can be employed, such as ratios that employ other values, such as conduit geometry, dimensions, or the like.

If the meter stiffness 232 is substantially the same as the baseline meter stiffness 230, then it can be determined that the vibratory meter 5, or more specifically, the conduits 130, 130', may be relatively unchanged from when it was manufactured, calibrated, or when the vibratory meter 5 was last re-calibrated. Alternatively, where the meter stiffness 232 significantly differs from the baseline meter stiffness 230, then it can be determined that the conduits 130, 130' have degraded and may not be operating accurately and reliably, such as where the conduits 130, 130' have changed due to erosion, corrosion, damage (e.g., freezing, over-pressurization, etc.), coating, or other condition.

As discussed above, the baseline meter stiffness 230 and the meter stiffness 232 are determined for both the left and right pick-off sensors 170*l*, 170*r*. That is, the baseline meter stiffness 230 and the meter stiffness 232 are proportional to the stiffness of the conduits 130, 130' between the left and right pick-off sensors 170*l*, 170*r*. As a result, different conditions of the conduits 130, 130' can cause similar stiffness changes 234. For example, erosion, corrosion, and/or damage to the conduits 130, 130' can result in similar decreases in physical stiffness, which may be indicated by a negative or "low" stiffness change 234. Accordingly, when only relying on the stiffness change 234, the specific condition of the conduits 130, 130' may not be ascertainable.

However, the left pick-off sensor 170*l* and the right pick-off sensor 170*r* can each have their own associated stiffness value. More specifically, as discussed above, the driver 180 applies a force to the conduits 130, 130' and the pick-off sensors 170*l*, 170*r* measure a resulting deflection. The amount of deflection of the conduits 130, 130' at the location of the pick-off sensors 170*l*, 170*r* is proportional to the stiffness of the conduits 130, 130' between the driver 180 and the pick-off sensors 170*l*, 170*r*.

Accordingly, the stiffness associated with the left pick-off sensor 170*l* is proportional to the physical stiffness of the conduits 130, 130' between the driver 180 and the left pick-off sensor 170*l* and the stiffness associated with the right pick-off sensor 170*r* is proportional to the physical stiffness of the conduits 130, 130' between the driver 180 and the right pick-off sensor 170*r*. Therefore, if there is erosion, corrosion, damage, coating, or the like, between the driver 180 and, for example, the right pick-off sensor 170*r*, then the stiffness associated with the right pick-off sensor 170*r* may decrease whereas the stiffness associated with the left pick-off sensor 170*l* may not change. To track the changes, the storage system 204 may also include stiffness values associated with the left and right pick-off sensors 170*l*, 170*r*.

For example, as shown in FIG. 2, the storage system 204 includes a baseline LPO stiffness 240, which is proportional to the physical stiffness of the conduits 130, 130' between the driver 180 and the location of the left pick-off sensor 170*l* on the conduits 130, 130'. Similarly, the storage system 204 also includes a baseline RPO stiffness 250, which is proportional to the physical stiffness of the conduits 130, 130' between the driver 180 and the location of the right pick-off sensor 170*r* on the conduits 130, 130'. The baseline LPO and RPO stiffness 240, 250 may be determined by the verification 220 before the vibratory meter 5 is installed in the field, such as, for example, during manufacture or calibration of the vibratory meter 5, or during a prior recalibration.

The storage system 204 also includes an LPO stiffness 242 and an RPO stiffness 252. The LPO stiffness 242 is proportional to the physical stiffness of the conduits 130, 130' between the driver 180 and the location of the left pick-off sensor 170*l*, but after the baseline LPO stiffness 240 is determined. Similarly, the RPO stiffness 252 is proportional to the physical stiffness of the conduits 130, 130' between the driver 180 and the location of the right pick-off sensor 170*r*, but after the baseline RPO stiffness 250 is determined.

Also as shown in FIG. 2, the storage system 204 further includes an LPO stiffness change 244 and an RPO stiffness change 254. The LPO and RPO stiffness change 244, 254 are proportional to a difference between the baseline LPO, RPO stiffness 240, 250 and the LPO, RPO stiffness 242, 252. For example, a negative LPO stiffness change 244 may indicate that the physical stiffness of the conduits 130, 130' between the driver 180 and the left pick-off sensor 170*l* has increased. A positive LPO stiffness change 244 may indicate that the physical stiffness of the conduits 130, 130' between the driver 180 and the left pick-off sensor 170*l* decreased since the baseline LPO stiffness 240 was determined. Alternatively, the LPO and RPO stiffness change 244, 254 may be a difference between the LPO and RPO stiffness 242, 252 and the baseline LPO and RPO stiffness 240, 250. Accordingly, for example, a positive LPO stiffness change 244 can indicate that the physical stiffness of the conduits 130, 130' between the driver 180 and the left pick-off sensor 170*l* increased since the baseline LPO stiffness 240 was determined. Although the LPO and RPO stiffness change 244, 254 are described as being determined from a difference, any values derived from or related to the baseline LPO and RPO stiffness 240, 250 and the LPO and RPO stiffness 242, 252 can be employed, such as a ratio of a stiffness value and other values, such as a conduit geometry, dimensions, or the like. The LPO and RPO stiffness change 244, 254 can be expressed in any suitable units, such as whole numbers, ratios, percentages etc.

An increase or decrease in the physical stiffness associated with the left and right pick-off sensors 170*l*, 170*r* can indicate an underlying condition of the conduit 130, 130' that is causing the physical stiffness change. For example, erosion of an inner wall of the conduits 130, 130' may reduce the physical stiffness of the conduits 130, 130'. In particular, erosion, for example, of the inner wall of the conduits 130, 130' between the left pick-off sensor 170*l* and the driver 180 may cause the physical stiffness of the conduits 130, 130' between the left pick-off sensor 170*l* and the driver 180 to decrease. Conversely, an increase in stiffness may indicate that, for example, coatings have formed on the inner wall.

Additionally, the relative increase or decrease of the physical stiffness of the conduits 130, 130' between the driver 180 and the left pick-off sensor 170*l* and the physical stiffness of the conduits 130, 130' between the driver 180 and the right pick-off sensor 170*r* can further indicate the underlying condition of the conduits 130, 130' causing the physical stiffness change. This relative increase or decrease in the physical stiffness may be indicated by a stiffness symmetry 260 in the storage system 204.

The stiffness symmetry 260 can be any suitable value or values that indicate the relative values of, for example, the LPO stiffness change 244 and the RPO stiffness change 254. For example, the LPO stiffness change 244 and the RPO stiffness change 254 may indicate that the physical stiffness of the conduits 130, 130' associated with the left and right pick-off sensors 170*l*, 170*r* both increased, but that, for example, the physical stiffness associated with the left pick-off sensor 170*l* increased more than the physical stiffness associated with the right pick-off sensor 170*r*. In one example, the stiffness symmetry 260 can be expressed in percentages and be determined by:

$$SMV_{Symmetry}\% = SMV_{Stiffness,LPO}\% - SMV_{Stiffness,RPO}\%;$$

where:
  $SMV_{Stiffness,LPO}\%$ is, in this example, the LPO stiffness change 244 expressed in percentage change; and
  $SMV_{Stiffness,RPO}\%$. is, in this example, the RPO stiffness change 254 expressed in percentage change.

The stiffness change 234, LPO stiffness change 244, RPO stiffness change 254, and stiffness symmetry 260 may be any suitable value, such as, for example, a value that is directly proportional to the property being measured, an intermediate value that represents the physical stiffness, a value that indicates whether there was an increase or decrease in the physical stiffness, etc. For example, the LPO stiffness change 244 may be a positive or negative value proportional to the stiffness change. The processing system 202 can further process these values to generate a toggle indicator where only an increase or decrease in the physical stiffness of the conduits 130, 130' between the driver 180 and the left pick-off sensor 170l is indicated. These values and/or toggle indicators can be utilized to determine the underlying change in the conduits 130, 130', as is shown in the following truth table.

| Case | LPO Stiffness Change 244 (High) | LPO Stiffness Change 244 (Low) | RPO Stiffness Change 254 (High) | RPO Stiffness Change 254 (Low) | Stiffness Symmetry 260 (High Right) | Stiffness Symmetry 260 (Low Right) | Condition of conduits 130, 130' UN = unchanged CT = coating E = erosion C = corrosion D = damage |
|---|---|---|---|---|---|---|---|
| A | 0 | 0 | 0 | 0 | 0 | 0 | UN |
| B | 0 | 0 | 0 | 0 | 0 | 1 | CT or E/C |
| C | 0 | 0 | 0 | 0 | 1 | 0 | CT or E/C |
| D | 0 | 1 | 0 | 1 | 0 | 0 | C |
| E | 1 | 0 | 1 | 0 | 0 | 0 | D |
| F | 0 | 0 | 1 | 0 | 1 | 0 | CT or D |
| G | 0 | 0 | 0 | 1 | 0 | 1 | CT or E/C |
| H | 1 | 0 | 0 | 0 | 0 | 1 | CT or D |
| I | 0 | 1 | 0 | 0 | 1 | 0 | CT or E/C |
| J | 0 | 1 | 0 | 1 | 0 | 1 | E/C |
| K | 0 | 1 | 0 | 1 | 1 | 0 | E/C |
| L | 1 | 0 | 1 | 0 | 0 | 1 | D |
| M | 1 | 0 | 1 | 0 | 1 | 0 | D |
| N | 1 | 0 | 0 | 1 | 0 | 1 | CT |
| O | 0 | 1 | 1 | 0 | 1 | 0 | CT |

As can be seen, the combinations of the LPO stiffness change 244, RPO stiffness change 254, and stiffness symmetry 260 can be used to distinguish between the different possible changes in the conduits 130, 130'. For example, both case J and N have stiffness symmetry 260 values that are "low right" and RPO stiffness change 254 that are "low." However, case J has a LPO stiffness change 244 of "low" whereas case N has a LPO stiffness change 244 of "high." Case J is indicated as a possible erosion/corrosion of the conduits 130, 130', whereas case N is indicated as a possible coating of the conduits 130, 130'.

Although the above table utilizes the LPO stiffness change 244, RPO stiffness change 254, and stiffness symmetry 260 to determine the condition of the conduits 130, 130', any suitable means, such as, alternative tables, logic, objects, relationships, circuits, processors, routines, or the like, can be employed to determine the condition in the conduit. For example, referring to the meter electronics 20 described with reference to FIG. 2, only the LPO stiffness change 244 and RPO stiffness change 254 may be utilized to determine the condition of the conduits 130, 130'. However, as can be appreciated, utilizing the stiffness symmetry 260 may allow for more specific determinations of the condition of the conduits 130, 130'.

Additionally or alternatively, the actual values of the LPO stiffness change 244, RPO stiffness change 254, and stiffness symmetry 260 may be employed instead of the toggle indicator to determine the condition of the conduit. For example, the conditions determined by the above table may be supplemented by further steps that determine, for example, that case J is more likely to be corrosion, rather than erosion, if the stiffness symmetry 260 is a relatively small "right low." That is, the relatively small "right low" stiffness symmetry 260 may be due to the more uniform nature of corrosion compared to erosion, which may be more prevalent at an inlet of a conduit.

Although the above discussion pertained to meter stiffness, other meter verification parameters may be employed, additionally or alternatively. For example, a residual flexibility may be compared to a baseline residual flexibility. Residual flexibility can be defined as a portion of a frequency response associated with one vibration mode that is at a resonant frequency of another vibration mode. For example, a frequency response of various vibration modes (e.g., bend, twist, etc.) may be characterized as a frequency response function (e.g., magnitude response relative to frequency). The frequency response function is typically centered at a resonant frequency of a given vibration mode with a sloping decrease in magnitude in proportion to the distance from the resonant frequency. For example, a first order bend mode (e.g., main out-of-phase bend mode) with two nodes located at brace bars, may have a first order bend mode resonant frequency $\omega_1$. A second order bend mode with four nodes may have a second order bend mode resonant frequency $\omega_2$ that is greater than the first order bend mode resonant frequency $\omega_1$. The frequency response function of the second order bend mode can overlap the first order bend mode resonant frequency $\omega_1$. Accordingly, the residual flexibility of the first order bend mode caused by the second order bend mode is the portion of the frequency response function of the second order bend mode that lies at the first order bend mode resonant frequency $\omega_1$. As can be appreciated, when erosion, corrosion, damage, coating, or the like occurs, this residual flexibility value of a given mode may change because the frequency response of each vibration mode will change. Accordingly, the residual flexibility can also be used to identify a change in the vibratory meter.

Damping can also be employed. For example, the meter verification can compare a measured damping value to a baseline damping value. Damping can be useful in detecting coating because damping may not be affected by erosion or corrosion.

Similarly, a mass associated with the left or right pick-off sensors 170l, 170r can be compared to a baseline mass associated with the left or right pick-off sensors 170l, 170r. In one example, an expected mass may be employed. In an example, an expected mass based on the calibrated air and water mass values and the measured or known density of the process fluid may be calculated using the below equation:

$$m_{expected} = m_{factory,air} + \frac{(m_{factory,water} - m_{factory,air})}{(\rho_{water} - \rho_{air})}(\rho_{known} - \rho_{air}); \quad [1]$$

where:
- $m_{expected}$ is the expected mass—the mass that should be measured if change did not occur in the vibratory meter;
- $m_{factory,air}$ is a mass measured where the vibratory meter is filled with air;
- $\rho_{air}$ is a density of air;
- $\rho_{water}$ is a density value of water; and
- $\rho_{known}$ is a density of the material being measured.

The expected $m_{expected}$ can be used to calculate a normalized mass deviation expressed as a percent via the following equation:

$$m_{Deviation} = \frac{m_{measured} - m_{expected}}{m_{expected}} * 100; \quad [2]$$

where:
- $m_{measured}$ is a mass measured during meter verification; and
- $m_{Deviation}$ is a mass deviation of the measured mass $m_{measured}$ from the expected mass $m_{expected}$.

As can be appreciated, erosion, corrosion, damage, coating, or the like, can affect the mass of the conduits in the vibratory meter. Accordingly, the expected mass can be used to detect a change in the vibratory meter by comparing a measured mass to the expected mass.

As discussed above, conduit geometries may also be considered when determining the condition of the conduit. For example, U-shaped tubes may be more prone to erosion than corrosion at certain locations in the conduit compared to, for example, a straight tube. Additionally or alternatively, some process/conduit combinations may be more prone to certain conditions. For example, the conduits 130, 130' may be more prone to damage in cryogenic processes that employ nitrogen compared to high temperature processes that employ a corrosive material. Accordingly, the LPO stiffness change 244, RPO stiffness change 254, and stiffness symmetry 260, or the methods that use these values, can include, for example, other values, such as factors related to conduit geometry, construction, dimensions, process variables, etc.

As can also be seen in FIG. 2, the storage system 204 can also store a stiffness standard deviation 236, an LPO stiffness standard deviation 246, and an RPO stiffness standard deviation 256. These values can be determined from the meter stiffness measurements that, for example, comprise the baseline meter stiffness 230 and the meter stiffness 232. For example, the stiffness standard deviation 236 may be a pooled standard deviation. Accordingly, the stiffness standard deviation 236 is a measure of how much the meter stiffness 232 varied, including the meter stiffness measurements that comprise the baseline meter stiffness 230. The LPO stiffness standard deviation 246 and the RPO stiffness standard deviation 256 may also be pooled standard deviations.

Although the example shown in FIG. 2 utilizes stiffness standard deviation, other measures of variation and dispersion in a meter verification parameter data may be employed. For example, a variance may be employed instead of a standard deviation. That is, the stiffness standard deviation 236, LPO stiffness standard deviation 246, and RPO stiffness standard deviation 256 are dispersion values of an exemplary meter verification parameter. Additionally or alternatively, other measures of central tendency can be employed instead of a mean value that may be employed for the baseline meter stiffness 230 and the meter stiffness 232. Accordingly, the baseline meter stiffness 230 and meter stiffness 232 are central tendency values of an exemplary meter verification parameter.

The storage can also store other statistical values, such as a confidence interval 270. As will be explained in more detail below, the confidence interval 270 can be calculated based on a t-value 272, a significance level 274, and a degree-of-freedom 276. The significance level 274 may be a scalar value that is set, for example, by the verification 220. The significance level 274 can be defined as the probability of rejecting a null hypothesis when the hypothesis is actually true (e.g., detecting a change when a change has not occurred in the vibratory meter) and is typically a small value, such as 1% or 0.01. The degree-of-freedom 276 is calculated from the number of samples used to determine, for example, the stiffness standard deviation 236. Also shown is a bias dead band 278, which is a scalar value that may also be set by the verification 220 to ensure that biases in the vibratory meter does not induce false flags.

The confidence interval 270 can detect small changes in the physical stiffness of the vibratory meter 5 while also reducing the number of false alarms compared to, for example, the predetermined limits previously used in meter verification. Additionally, the confidence interval 270 can be calculated using relatively simple mathematical operations, thereby allowing the processing system 202 to employ robust statistical techniques using a verification 220 that employs relatively simple embedded code.

Predetermined Alarm Limits

FIGS. 3a and 3b show graphs 300a, 300b that illustrate stiffness change and stiffness symmetry variations determined during multiple meter verification runs. As shown, the graphs 300a, 300b include run number axes 310a, 310b. The run number axes 310a, 310b range from 0 to 600 and indicate a run number for a meter verification. For example, run number "100" indicates a $100^{th}$ meter verification run out of 600 meter verification runs. The graph 300a also includes a percent change in stiffness axis 320a, which is a percentage representation of, for example, the LPO stiffness change 244 and the RPO stiffness change 254. The graph 300b includes a percent stiffness difference axis 320b, which is a percentage representation of, for example, the stiffness symmetry 260. For example, a 0 percent stiffness difference means, for example, that the LPO stiffness change 244 is equal to the RPO stiffness change 254. The graphs 300a, 300b also respectively show stiffness change data 330a and stiffness difference data 330b.

The stiffness change data 330a and the stiffness difference data 330b are comprised of data points determined in groups of runs for various flow material/flow rate configurations where coating is present in conduits. More specifically, there are four groups of data, which are discernable from the stiffness difference data 330b. The first two groups may be based on high and low water flow. The latter two groups may be based on high and low air flow.

The graph 300a shown in FIG. 3a includes stiffness change data 330a that is comprised of data points representing a stiffness change for a given meter verification run. As can be seen, the stiffness change data 330a ranges from about −0.3% to about 2.0%. As can be appreciated, this seems to indicate that the stiffness is changing. However, an alarm may not be provided if an alarm limit is set at, for example, 4%.

The graph 300b shown in FIG. 3b includes stiffness difference data 330b that is comprised of data points representing a stiffness difference, for example, the LPO stiffness change 244 and the RPO stiffness change 254. As can be seen, the stiffness difference data 330b ranges from about −0.4% to about 0.6%. As can also be seen, the stiffness difference data 330 includes sporadic data points that do not follow any discernable trend. In addition, the stiffness difference data 330b suggests that stiffness symmetry values may be affected by the material in the conduit.

The graphs 300a, 300b illustrate that an alarm may not be raised if the alarm limit or range is greater than the stiffness change associated with a change in the vibratory meter. Additionally, if the alarm limit is less than sporadic data points, a false alarm may be raised. The following addresses this issue by eliminating limits and employing statistics that are able to execute on an embedded system.

Statistics for Embedded Code

Statistical methods that calculate the probability of an outcome can be used to detect a change in the vibratory meter but, due to their complexity, could not be performed by the meter electronics 20. For example, P and T statistics may be employed to test whether a null hypothesis is met for a given set of data. Rejecting the null hypothesis does not determine if a condition exists in the vibratory meter, but that it is false that there is a lack of the condition. In the case of meter verification, the null hypothesis may be defined as: "the current meter verification result has the same mean as the baseline meter verification result." If this null hypothesis is disproven, then it can be assumed that mean of the current result is not the same as the baseline meter verification result due to a change in the vibratory meter.

By way of illustration, in a t-test, a t-value may be calculated using the following equation:

$$t = \frac{\bar{x} - \mu_0}{s/\sqrt{n}}, \quad [3]$$

where:
$\mu_0$ is some specified value;
$\bar{x}$ is a sample mean;
s is a sample standard deviation; and
n is the sample size.

In the context of meter verification, $\mu_0$ is a reference meter verification value, such as a baseline stiffness value. Meter verification measurements are used to calculate the sample mean $\bar{x}$ and the sample standard deviation s for comparison with reference meter verification value. The number of meter verification measurements is the sample size n. The t-test also typically includes a degree-of-freedom, which, for the above equation [1], is defined as n−1.

As discussed above, the t-test can be used to test a null hypothesis, which, for meter verification, may be defined as whether the sample mean $\bar{x}$ is equal to the reference meter verification value. To test the null hypothesis, a P-value may be calculated using a known distribution of the t-value. To test the null hypothesis, the P-value is compared to a significance level α. The significance level α is typically set to a small value, such as, for example, 0.01, 0.05, or 0.10. If the P-value is less than or equal to the significance level α, then the null hypothesis is rejected for an alternative hypothesis. Since the null hypothesis is defined as "the current meter verification result has the same mean as the baseline meter verification result", the alternative hypothesis is that the current meter verification does not have the same mean and, therefore, a change has occurred in the meter.

However, the P-value is difficult to calculate with limited computing resources. For example, the P-value may be calculated on a computer workstation with an operating system and a statistical software but may not be easily calculated in an embedded system. The meter electronics 20 described above may be an embedded system with limited computational resources. In addition, the ability to reject the null hypothesis in situ or in real time on the meter electronics could prevent the meter electronics 20 from sending false alarms while also correctly detecting a change in the conduits 130, 130', which is a significant improvement over using predetermined alarm limits.

To this end, a confidence interval that exploits the meter electronics' 20 limited computing resources is used instead of the P-value. As a result, the confidence interval can be calculated using the embedded code on the meter electronics 20. For example, the meter electronics 20 can have a current stiffness value and a stiffness standard deviation value stored in two registers. As can be appreciated, the t-value described above can be calculated using the current stiffness value by using a significance level α and a degree-of-freedom. By way of example, the significance level α may be set at 0.01, which is a 99% confidence level. The number of meter verification tests may be set as 5. Accordingly, a pooled degree-of-freedom is determined to be 2·(5−1)=8. A two-tailed student t-value can be calculated from the significance level α and the pooled degree-of-freedom using a student t-value function as follows:

$$t_{Student,99,8} = tinv(1-0.01/2,8) = 3.36. \quad [4]$$

A pooled standard deviation of stiffness values associated with the left and right pick-off sensors 170l, 170r may also be used. In a general case, calculating the pooled standard deviation can be complicated. However, due to the meter electronics 20 storing the measured stiffness standard deviation in the registers, the pooled standard deviation can simply be the stored standard deviation, such as the stiffness standard deviation 236 described above. A pooled standard error may also be calculated, which is defined as follows:

$$stderror_{pooled} = \sqrt{\frac{(2 \cdot (stddev_{pooled})^2)}{n_{DOF}}} \quad [5]$$

$$stderror_{pooled} = \sqrt{2/8} \cdot \sqrt{stddev_{pooled}^2}$$

$$stderror_{pooled} = 0.5 \cdot stddev_{pooled}.$$

A confidence interval range can be calculated using the above determined standard error and the t-value as follows:

$$CI_{range} = stderror_{pooled} \cdot t_{student,99,8}; \quad [6]$$

$$CI_{range} = stderror_{pooled} \cdot 3.36.$$

Finally, the confidence interval can be calculated using the stiffness mean and the confidence interval range, which is shown in the following:

$$CI = Stiffness_{mean} \pm CI_{range}.$$

The confidence interval can be used to test the null hypothesis by determining if the confidence interval includes 0.0. If the confidence interval does include 0.0, then the null hypothesis is not rejected and the meter verification passes. If the confidence interval does not include 0.0, then the null hypothesis may be rejected and a meter verification fault may be sent.

As can be appreciated, by using a confidence interval instead of a P-value where the meter electronics 20 stores the stiffness value and the stiffness standard deviation value, the computations are relatively simple and can be performed using embedded code. For example, the meter electronics 20, which may not have sufficient computing resources to calculate the P-value, can calculate the confidence interval to perform in-situ or real time statistical analysis. As can also be appreciated, the confidence interval can be used to test the null hypothesis with a desired confidence level.

In addition to the confidence interval, a bias dead band may be defined around zero to account for a bias in the meter stiffness measurements. The bias in the meter stiffness measurements may be due to the mounting, density, temperature gradients, or other conditions of the vibratory meter that can affect the meter verification measurements. This bias dead band in the t-test is a value around zero for which a small bias with a small variation, that would otherwise cause the confidence interval check to reject the hypothesis, does not reject the hypothesis. Accordingly, this bias dead band can be set to a value that reduces the number of false alarms sent by the meter electronics 20.

In the example of a confidence interval that is compared to a zero, the bias dead band is a range around zero where, if the zero is not within the confidence interval but a portion of the bias dead band is within the confidence interval, then the null hypothesis will not be rejected. Mathematically, this test can be expressed as whether the mean meter stiffness value is less than the bias dead band. Or using the above discussed nomenclature: if $\bar{x} < db_{bias}$, where $db_{bias}$ is the bias dead band, then the null hypothesis cannot be rejected.

The bias dead band can be implemented alone or in conjunction with other dead bands. For example, the bias dead band can be implemented in conjunction with a variation dead band. In one example, the variation dead band can be determined from $db_{variation} = db_{bias}/t_{student,99,8}$, where the $db_{variation}$ is the variation dead band. The variation dead band may be compared with a meter stiffness standard deviation to determine if the null hypothesis should be rejected. In an example, the bias dead band may be compared as discussed above and the variation dead band can be compared to the meter stiffness standard deviation as follows: if $\bar{x} < db_{bias}$ and if $s < db_{variation}$, then the null hypothesis cannot be rejected. The foregoing test can be utilized after the null hypothesis has been rejected by the confidence interval check. Alternatively, if $\bar{x} < db_{bias}$ and if $s < db_{variation}$, then the mean meter stiffness $\bar{x}$ is set to zero and a meter stiffness variation is to be equal to the variation dead band. Accordingly, when the confidence interval check is performed, the null hypothesis may not be rejected due to bias in the meter stiffness measurements.

Figure 4A:
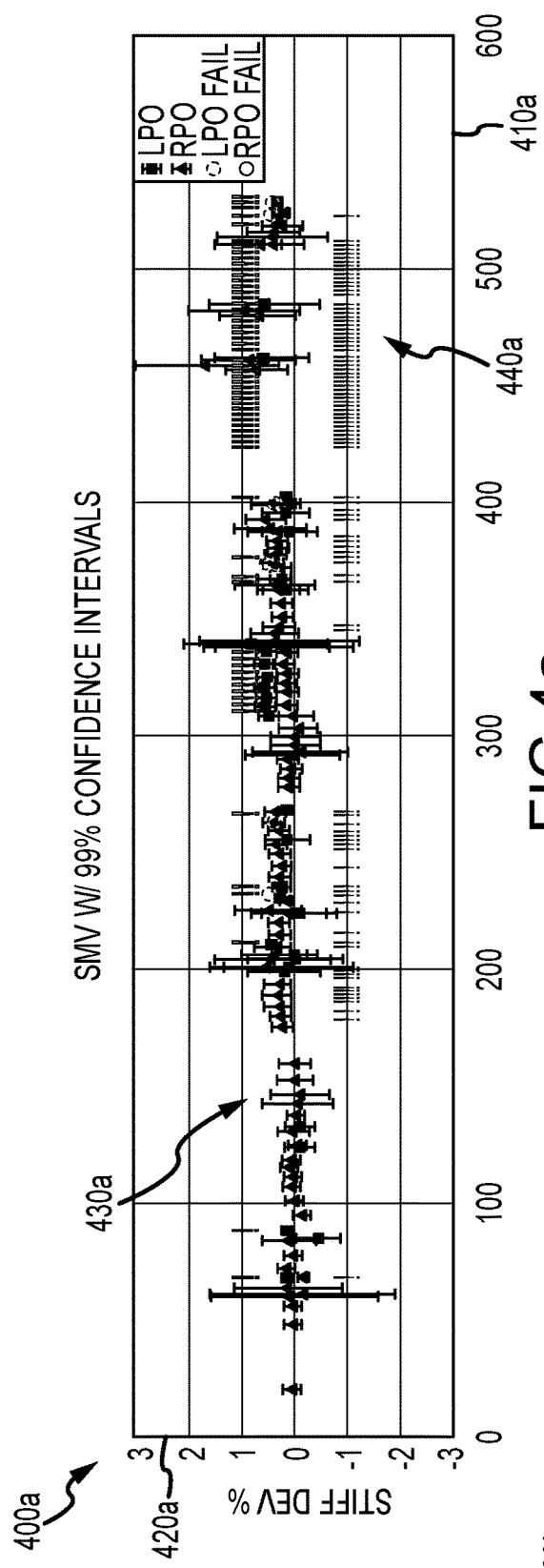
FIGS. 4a and 4b show graphs 400a, 400b that illustrate stiffness change and stiffness symmetry variation data points determined during multiple meter verification runs, where a probability distribution is assigned to each data point.
Figure 4B:
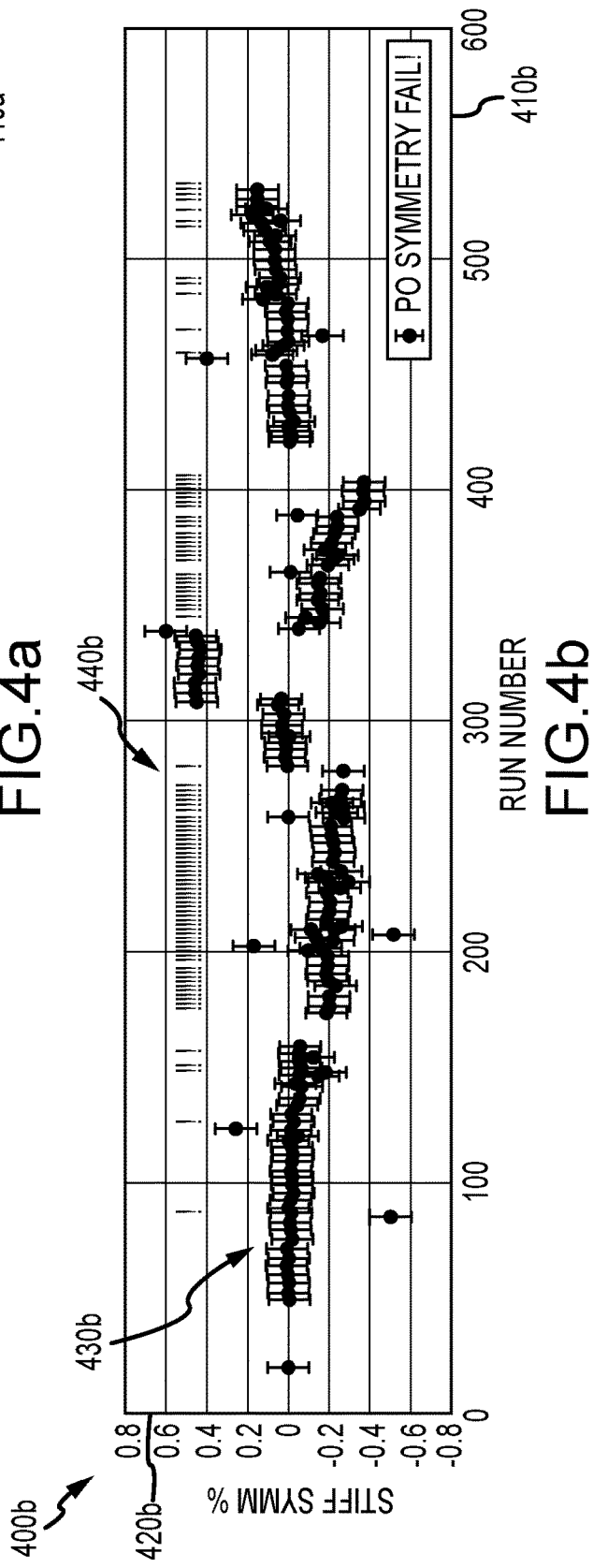

FIGS. 4a and 4b show graphs 400a, 400b that illustrate stiffness change and stiffness symmetry variation data points determined during multiple meter verification runs, where a probability distribution is assigned to each data point. As shown, the graphs 400a, 400b include run number axes 410a, 410b. The run number axes 410a, 410b range from 0 to 600 and indicate a run number for a meter verification. The graph 400a also includes a percent change in stiffness axis 420a, which is a percentage representation of, for example, the LPO stiffness change 244 and the RPO stiffness change 254. The graph 400b includes a percent stiffness difference axis 420b, which is a percentage representation of, for example, the stiffness symmetry 260.

FIGS. 5a and 5b show graphs 500a, 500b that illustrate stiffness change and stiffness symmetry variation data points determined during multiple meter verification runs, where a probability is assigned to each data point. As shown, the graphs 500a, 500b include run number axes 510a, 510b. The run number axes 510a, 510b range from 0 to 140 and indicate a run number for a meter verification. The graph 500a also includes a percent change in stiffness axis 520a, which is a percentage representation of, for example, the LPO stiffness change 244 and the RPO stiffness change 254. The graph 500b includes a percent stiffness difference axis 520b, which is a percentage representation of, for example, the stiffness symmetry 260.

The graphs 400a, 500a include stiffness deviation plots 430a, 530a comprised of a plurality of data points representing a stiffness deviation, which may be the stiffness change 234 stored in the storage system 204, of a meter stiffness. The graphs 400b, 500b include stiffness symmetry plots 430b, 530b comprised of data points representing stiffness symmetry change. Also shown are change indication plots 440a-540b illustrated as exclamation points, which indicate that a confidence interval does not include a zero.

In FIGS. 4a-5b, the change indication plots 440a-540b are used to indicate that a rejection of the null hypothesis has occurred for a given data point. As discussed above, the null hypothesis may be when the measured value equals the baseline value, but that this test is performed with a probability. As shown in FIGS. 4a-5b, the probability is a confidence interval, although any suitable probability may be employed. The confidence interval is represented by bars associated with each data point. In the examples shown in FIGS. 4a-5b, the bars represent a 99% confidence interval.

As can be appreciated, the exclamation points are associated with data points where the confidence interval does not include the zero axis. In FIG. 5b, the zero axis of the stiffness symmetry represents the null hypothesis that the measured stiffness symmetry equals a baseline stiffness symmetry value. That is, the zero axis represents no change in the stiffness symmetry of the vibratory meter. Accordingly, when the confidence interval does not include the zero axis, the null hypothesis is rejected. This indicates, for example, with at least a 99% percent confidence, where the significance level is set at 0.01, that the null hypothesis has been rejected and a change has occurred in the vibratory meter.

As can be appreciated, various systems and methods can use the above described LPO stiffness change 244, RPO stiffness change 254, and stiffness symmetry 260 to indicate the change in the conduits 130, 130'. Exemplary methods are described in more detail in the following with reference to FIG. 6.

Figure 6:
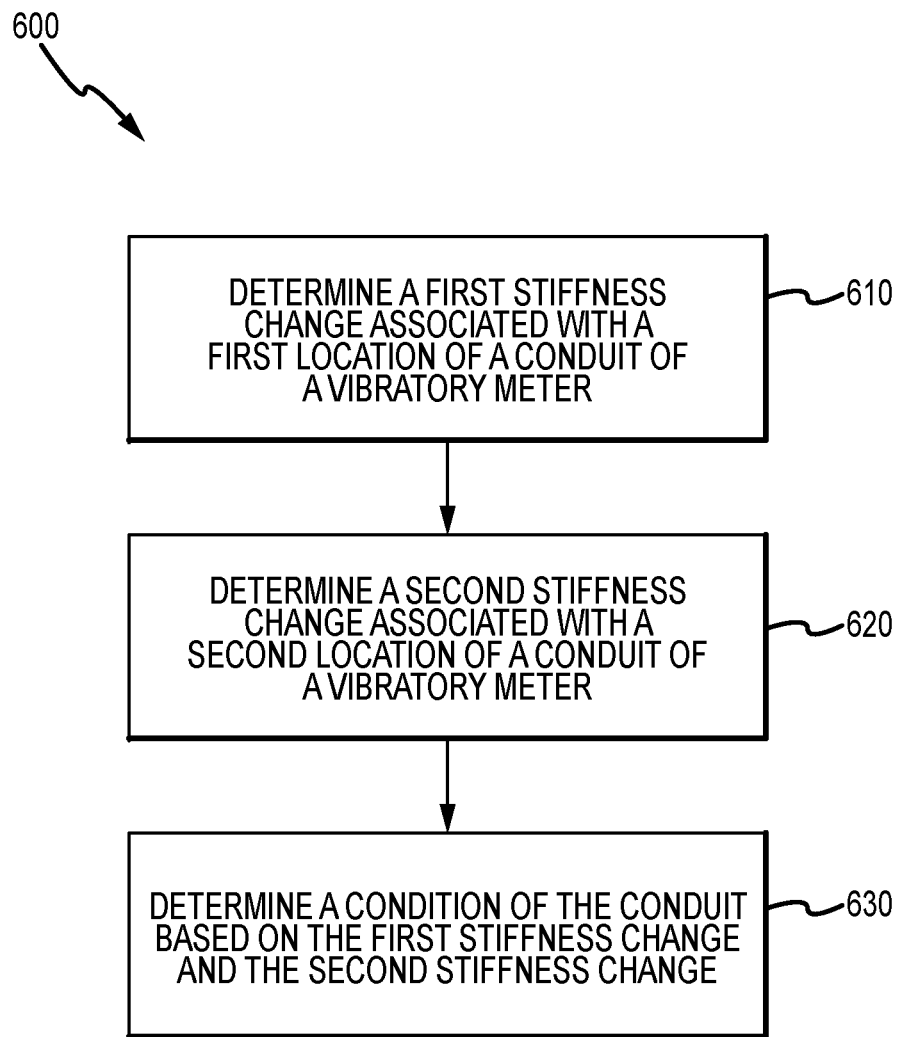
FIG. 6 shows a method 600 for detecting and identifying a change in a vibratory meter according to an embodiment.

FIG. 6 shows a method 600 for detecting and identifying a change in a vibratory meter according to an embodiment. As shown in FIG. 6, the method 600 begins by determining a first stiffness change associated with a first location of a conduit of a vibratory meter in step 610. The vibratory meter and conduit may be the vibratory meter 5 and one of the conduits 130, 130' described with reference to FIG. 1. In accordance with this example, the first location of the conduit can, for example, be the location of the left pick-off sensor 170*l* on the conduit 130, although any suitable location may be employed. The first stiffness change associated with the first location may therefore be the LPO stiffness change 244, which, as discussed above, may represent a physical stiffness change of the conduit 130 between the driver 180 and the location of the left pick-off sensor 170*l*.

The method 600, in step 620, can determine a second stiffness change associated with a second location of the conduit in the vibratory meter. Continuing with the example described above with reference to step 610, the second location of the conduit can be a location of the right pick-off sensor 170*r* on the conduit 130, although any suitable location can be employed. The second stiffness change associated with the second location may therefore be the RPO stiffness change 254 associated with the location of the right pick-off sensor 170*r* on the conduit 130, which, as discussed above, may represent a physical stiffness change of the conduit 130 between the driver 180 and the location of the right pick-off sensor 170*r*.

In step 630, the method 600 determines a condition in the conduit based on the first stiffness change and the second stiffness change. In the above discussed example, the condition may be determined based on the LPO stiffness change 244 and the RPO stiffness change 254. The condition may be anything that affects the stiffness of the conduit, such as erosion, corrosion, damage (e.g., freezing, over-pressurization, etc.), coating, or the like. By way of example, the first and second stiffness change may be the LPO stiffness change 244 and RPO stiffness change 254 indicated as "low." Additionally, the stiffness symmetry 260, which may also be based on the LPO stiffness change 244 and the RPO stiffness change 254, may be "low right". The method 600 can, for example, employ a table similar to the table described above to determine that the condition of the conduit 130 is corrosion/erosion.

The method 600 can further identify, suggest, or allow procedures suited for each of the determined conditions of the conduit. For example, the alarm may be provided with the determined condition of the conduit and the user can proceed with further diagnostics, maintenance, servicing, etc., that are specific to that condition. The procedure for damaged conduits may include removing the vibratory meter 5 from operation and repairing/replacing the meter assembly 10. In the case of coatings, procedures that reduce or eliminate the coating without removing the vibratory meter 5 from operation may be more appropriate.

Figure 7:
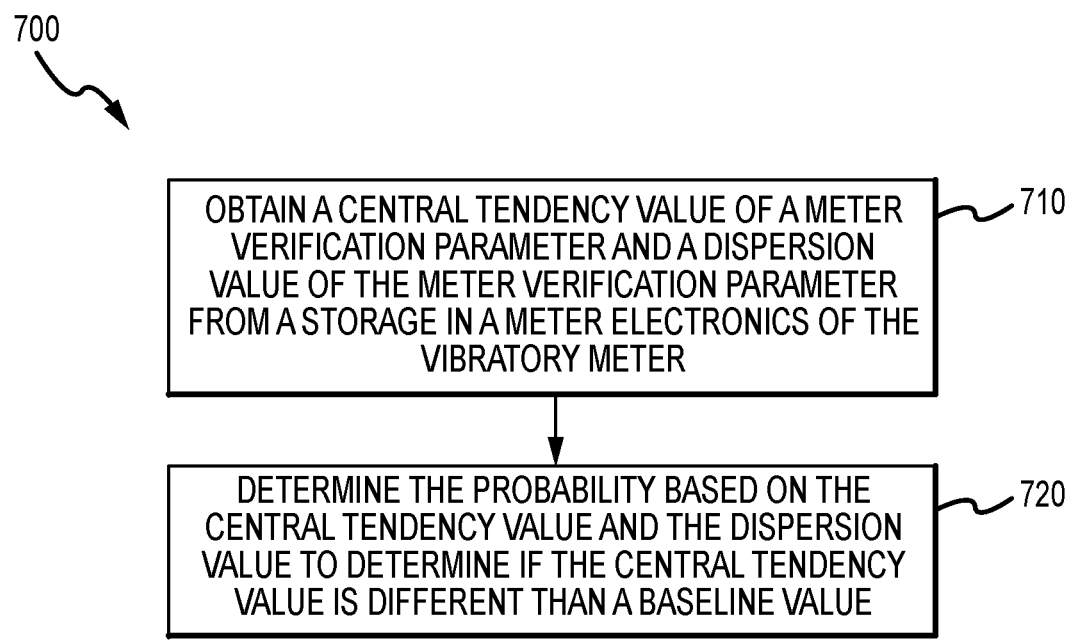
FIG. 7 shows a method 700 for detecting and identifying a change in a vibratory meter according to an embodiment.

FIG. 7 shows a method 700 for detecting and identifying a change in a vibratory meter. As shown in FIG. 7, the method 700 begins by obtaining a central tendency value of a meter verification parameter and a dispersion value of the meter verification parameter from a storage in a meter electronics of the vibratory meter in step 710. In step 720, the method 700 determines a probability based on the meter verification parameter and the dispersion value to determine if the central tendency value is different than a baseline value.

In step 710, the central tendency value and the dispersion value may be obtained from, for example, the storage system 204 described above with reference to FIG. 2. The storage system 204 may be registers of the processing system 202. Accordingly, the processing system 202 may obtain the central tendency value and the dispersion value from the registers and perform simple mathematical operations to determine the probability. In one example, the central tendency value may be a meter stiffness and the dispersion value may be a meter stiffness standard deviation.

In the example using the meter stiffness and the dispersion value, in step 720, the processing system 202 can calculate a t-value based on the number of meter stiffness measurements comprising the meter stiffness and calculate the probability using the t-value. In one example, the t-value can be determined from a significance level $\alpha$ and a degree-of-freedom, as discussed above. The meter stiffness may, for example, be a mean meter stiffness determined from meter stiffness measurements taken after the baseline value, such as a baseline meter stiffness, was determined. The baseline value may be a baseline central tendency value. Accordingly, the baseline meter stiffness may be a mean of baseline meter stiffness measurements.

The method 700 may include additional steps, such as, for example, setting a bias dead band. As discussed above, if a meter stiffness, which may be the central tendency value, is less than the bias dead band, then the method 700 may determine that the meter stiffness and the baseline meter stiffness are not different. For example, before the meter stiffness is compared with the bias dead band, a confidence interval may not include a zero and, therefore, a flag may be set indicating that the null hypothesis has been rejected. However, if the meter stiffness is less than the bias dead band, then the flag may be reset to indicate that the null hypothesis has not been rejected. Accordingly, the method 700 may not send an alarm.

The meter electronics 20 described with reference to FIG. 1, or other electronics, devices, or the like, can perform the methods 600, 700, or other methods that detect and/or identify a change in a vibratory meter. Accordingly, the meter electronics 20, and the processing system 202, may be configured to receive information from the interface 201 and determine a first stiffness change associated with a first location of a conduit 130, 130' of the vibratory meter 5 and determine a second stiffness change associated with a second location of the conduit 130, 130' of the vibratory meter 5. With reference to the vibratory meter 5 of FIG. 1, the first location may be a location of a left pick-off sensor 170*l* on the conduit 130, 130' of the vibratory meter 5. Similarly, the second location may be a location of a right pick-off sensor 170*r* on the conduit 130, 130' of the vibratory meter 5.

The meter electronics 20 can also be configured to determine a condition of the conduit 130, 130' based on the first stiffness change and the second stiffness change. The meter electronics 20 may also be configured to determine a stiffness symmetry, such as the stiffness symmetry 260 shown in FIG. 2, of the conduit 130, 130'. The meter electronics 20 may also be configured to provide an alarm based on the determination of the condition of the conduit. The alarm may be provided by, for example, sending a signal, message, packet, etc., over path 26.

The meter electronics 20 and, in particular, the processing system 202, can also obtain a meter stiffness and a meter stiffness standard deviation from the storage in the meter electronics 20. The meter electronics 20 or processing system 202 can determine a probability based on the meter stiffness and the meter stiffness standard deviation to determine if the meter stiffness is different than a baseline meter stiffness.

The above description provides a meter electronics 20 and methods 600, 700 that can detect and identify a change in the vibratory meter 5. The change can be identified by detecting a condition of the conduits 130, 130' in the vibratory meter 5 based on a first stiffness change associated with a first location of a conduit and a second stiffness change associated with a second location of a conduit. These and other steps can be performed by the meter electronics 20, processing system 202 in the meter electronics 20, and/or method 600, or other electronics, systems, and/or methods.

The change can be detected by employing statistics in a specific way such that a probability can be determined with limited computational resources. For example, the probability may be a confidence interval around a meter stiffness where if a zero is within the confidence interval, then a null hypothesis is rejected. In addition, to ensure that biases in the meter stiffness measurements do not induce false alarms, the meter electronics 20 can compare the meter stiffness to a bias dead band. Accordingly, in contrast to limits that do not change, the probability, which may be continually updated, can accurately detect the change in the vibratory meter 5 without causing false alarms.

Although the above discussion refers to the vibratory meter 5 shown in FIG. 1, any suitable vibratory meter may be employed. For example, vibratory meters with more than one driver and more than two pick-off sensors may be employed. Accordingly, in an exemplary vibratory meter having two pick-off sensors and two drivers, more than two stiffness changes may be determined. In this example, stiffness changes between each of the drivers and each of the pick-off sensors may be determined. Similarly, symmetry between the stiffness changes between the two drivers and two sensors may also be determined.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description. Thus, although specific embodiments are described herein for illustrative purposes, various equivalent modifications are possible within the scope of the present description, as those skilled in the relevant art will recognize. The teachings provided herein can be applied to other identification of a change in a vibratory meter and not just to the embodiments described above and shown in the accompanying figures. Accordingly, the scope of the embodiments described above should be determined from the following claims.

We claim:

1. A meter electronics (20) for detecting and identifying a change in a vibratory meter (5), the meter electronics (20) comprising:
    an interface (201) configured to receive sensor signals (100) from a meter assembly (10) and provide information based on the sensor signals (100); and
    a processing system (202) communicatively coupled to the interface (201), said processing system (202) being configured to use the information to:
        determine a first stiffness change associated with a first location of a conduit (130, 130') of the vibratory meter (5);
        determine a second stiffness change associated with a second location of the conduit (130, 130') of the vibratory meter (5); and
        determine a condition of the conduit (130, 130') based on a combination of the first stiffness change and the second stiffness change.

2. The meter electronics (20) of claim 1, wherein:
    the first location is a location of a left pick-off sensor (170*l*) on the conduit (130, 130') of the vibratory meter (5); and
    the second location is a location of a right pick-off sensor (170*r*) on the conduit (130, 130') of the vibratory meter (5).

3. The meter electronics (20) of claim 1, wherein:
    the first stiffness change represents a physical stiffness change of the conduit (130, 130') between a driver (180) and the first location of the conduit (130, 130'); and
    the second stiffness change represents a physical stiffness change of the conduit (130, 130') between the driver (180) and the second location of the conduit (130, 130').

4. The meter electronics (20) of claim 1, wherein the meter electronics (20) is further configured to determine a stiffness symmetry of the conduit (130, 130').

5. The meter electronics (20) of claim 4, wherein the stiffness symmetry of the conduit (130, 130') is determined based on the first stiffness change and the second stiffness change.

6. The meter electronics (20) of claim 1, wherein the processing system (202) is further configured to provide an alarm based on the determination of the condition of the conduit.

7. The meter electronics (20) of claim 1, wherein the condition of the conduit (130, 130') comprises at least one of an erosion, a corrosion, a damage, and a coating of the conduit (130, 130') of the vibratory meter (5).

8. The meter electronics (20) of claim 1, wherein the processing system (202) is further configured to determine the condition of the conduit (130, 130') based on at least one of a residual flexibility, a damping, and a mass of the conduit (130, 130').

9. A method for detecting and identifying a change in a vibratory meter, the method comprising:
    determining a first stiffness change associated with a first location of a conduit of the vibratory meter;
    determining a second stiffness change associated with a second location of the conduit of the vibratory meter; and
    determining a condition of the conduit based on a combination of the first stiffness change and the second stiffness change.

10. The method of claim 9, wherein:
    the first location is a location of a left pick-off sensor on the conduit of the vibratory meter; and
    the second location is a location of a right pick-off sensor on the conduit of the vibratory meter.

11. The method of claim 9, wherein:
    the first stiffness change represents a physical stiffness change of the conduit between a driver and the first location of the conduit; and
    the second stiffness change represents a physical stiffness change of the conduit between the driver and the second location of the conduit.

12. The method of claim 9, further comprising determining a stiffness symmetry of the conduit.

13. The method of claim 12, wherein the stiffness symmetry of the conduit is determined based on the first stiffness change and the second stiffness change.

14. The method of claim 9, further comprising providing an alarm based on the determination of the condition of the conduit.

15. The method of claim 9, wherein the condition of the conduit comprises at least one of an erosion, a corrosion, a damage, and a coating of the conduit of the vibratory meter.

\* \* \* \* \*